(12) United States Patent
Zhang et al.

(10) Patent No.: US 7,761,444 B2
(45) Date of Patent: Jul. 20, 2010

(54) IDENTIFYING A SEQUENCE OF BLOCKS OF DATA TO RETRIEVE BASED ON A QUERY

(75) Inventors: Bin Zhang, Fremont, CA (US); Qiming Chen, Cupertino, CA (US); Umeshwar Dayal, Saratoga, CA (US); Meichun Hsu, Los Altos Hills, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 325 days.

(21) Appl. No.: 11/543,494

(22) Filed: Oct. 5, 2006

(65) Prior Publication Data

US 2008/0086446 A1 Apr. 10, 2008

(51) Int. Cl.
*G06F 19/00* (2006.01)
(52) U.S. Cl. ..................................... 707/713
(58) Field of Classification Search ........................ None
See application file for complete search history.

(56) References Cited

U.S. PATENT DOCUMENTS

| | | | | |
|---|---|---|---|---|
| 4,536,836 | A * | 8/1985 | Dodd et al. | 711/113 |
| 5,222,235 | A * | 6/1993 | Hintz et al. | 707/101 |
| 5,652,859 | A * | 7/1997 | Mulla et al. | 711/146 |
| 5,680,573 | A * | 10/1997 | Rubin et al. | 711/129 |
| 5,797,000 | A * | 8/1998 | Bhattacharya et al. | 707/2 |
| 5,799,210 | A * | 8/1998 | Cohen et al. | 710/56 |
| 5,842,208 | A * | 11/1998 | Blank et al. | 707/7 |
| 6,226,724 | B1 * | 5/2001 | Biggs | 711/170 |
| 6,230,220 | B1 * | 5/2001 | Cohen et al. | 710/52 |
| 6,636,849 | B1 * | 10/2003 | Tang et al. | 707/6 |
| 6,675,170 | B1 * | 1/2004 | Flake | 707/101 |
| 6,732,121 | B1 * | 5/2004 | El-Gazzar | 707/104.1 |
| 6,732,237 | B1 * | 5/2004 | Jacobs et al. | 711/119 |
| 2001/0013087 | A1 * | 8/2001 | Ronstrom | 711/133 |
| 2003/0005227 | A1 * | 1/2003 | Yamazaki | 711/119 |
| 2007/0174817 | A1 * | 7/2007 | Fanning et al. | 717/124 |
| 2007/0250676 | A1 * | 10/2007 | Lietz et al. | 711/165 |

OTHER PUBLICATIONS

Andrew V. Goldberg and Robert E. Tarjan (1988). "A new approach to the maximum-flow problem". Journal of the ACM 35: 921-940. ACM Press. doi:10.1145/48014.61051. ISSN 0004-5411.*

(Continued)

*Primary Examiner*—Charles Rones
*Assistant Examiner*—Kurt Mueller (57) ABSTRACT

A computer-executable method receives at least one query that specifies requests involving blocks of data. Based on information associated with at least one query, a sequence is identified relating to an order in which the blocks are to be retrieved into a storage for processing the requests. An output is provided for the at least one query based on retrieving the blocks into the storage according to the identified sequence. According to another implementation, a method includes caching blocks of data associated with processing a database query in a temporary storage, and replacing at least some of the blocks of data in the temporary storage using a first replacement algorithm this is based on information associated with processing the database query, and where the first algorithm is different from a second replacement algorithm used by an operating system of the database system.

22 Claims, 4 Drawing Sheets

OTHER PUBLICATIONS

Ravindra K. Ahuja et al., Network Flows: Theory, Algorithms, and Applications, pp. 4-9, 510-542, 649-686, 1993, Prentice-Hall, Upper Saddle River, NJ.*

BitTorrent (protocol). (Aug. 7, 2009). In Wikipedia, The Free Encyclopedia. Retrieved 13:09, Aug. 7, 2009, from http://en.wikipedia.org/w/index.php?title=BitTorrent_(protocol)&oldid=306595167.*

BitTorrent Protcol Specificaiton 1.0. (Aug. 7, 2009). Theroy.org. Retrieved 13:10, Aug. 7, 2009, from http://wiki.theory.org/index.php?title=BitTorrentSpecification&oldid=3331.*

Bram Cohen. Incentives Build Robustness in BitTorrent, May 22, 2003.*

B. Zhang et al., U.S. Appl. No. 11/340,081, entitled "Determining an Amount of Flow Through, or a Cut of, a Parameterized Network," filed Jan. 25, 2006, pp. 1-23, Fig. 1-7.

B. Zhang et al., U.S. Appl. No. 11/159,454, entitled "Determination of a State of Flow Through or a Cut of a Parameterized Network," filed Jun. 22, 2005, pp. 1-24, Figs. 1-6.

B. Zhang et al., U.S. Appl. No. 11/048,301, entitled "System and Method for Selecting a Portfolio," filed Jan. 31, 2005, pp. 1-22, Figs. 1-4.

R.E. Tarjan et al., U.S. Appl. No. 11/450,706, entitled "Identifying a Minimum Cut and/or a Maximum Flow Using Balancing of Vertex Excesses," filed Jun. 9, 2006, pp. 1-24, Figs. 1-5.

* cited by examiner

IDENTIFYING A SEQUENCE OF BLOCKS OF DATA TO RETRIEVE BASED ON A QUERY

BACKGROUND

Data is often collected and stored in databases. Access to a database is managed by a database management system, such as a relational database management system (DBMS or RDBMS). To retrieve or update data in a database, database queries, such as Structured Query Language (SQL) queries, are submitted to the database management system.

A database typically includes multiple tables, where each table contains data arranged in rows and columns. In large databases, tables can be relatively large, with some tables having tens of millions to hundreds of millions of rows. In a database management system, tables are stored in persistent storage, which is usually implemented with large disk-based storage devices. Persistent storage usually has slower access speeds than non-persistent storage, such as volatile memory in the database management system. However, due to higher costs associated with higher-speed memory, the storage capacity of higher-speed memory in a database management system is usually much smaller than the storage capacity of persistent storage.

When performing a database operation, portions of tables are retrieved from persistent storage into the memory of the database management system to allow for faster processing. As the memory fills up during the database operation, data portions in the memory are replaced with new data portions retrieved from the persistent storage. Often, the replacement strategy for replacing data portions in memory with new data portions is a least-recently-used (LRU) replacement strategy (or some variation thereof) provided by some operating systems or implemented inside the DBMS software, which are part of database management systems. The LRU replacement strategy removes least-recently-used data from the memory for replacement with new data.

A database operation, such as a join operation that joins multiple tables to produce a result, often involves repeated accesses to certain rows of one or more tables. Thus, as a database management system proceeds through a database operation, and rows that are in memory are replaced with other rows, the replaced rows may have to be later read back from persistent storage into the memory. Repeated retrievals of the same pieces of data from persistent storage to memory, especially if such repeated retrievals occur often, will result in increased I/O (input/output) accesses that can reduce performance of the database management system.

BRIEF DESCRIPTION OF THE DRAWINGS

Some embodiments of the invention are described with respect to the following figures.

DETAILED DESCRIPTION

Figure 1:
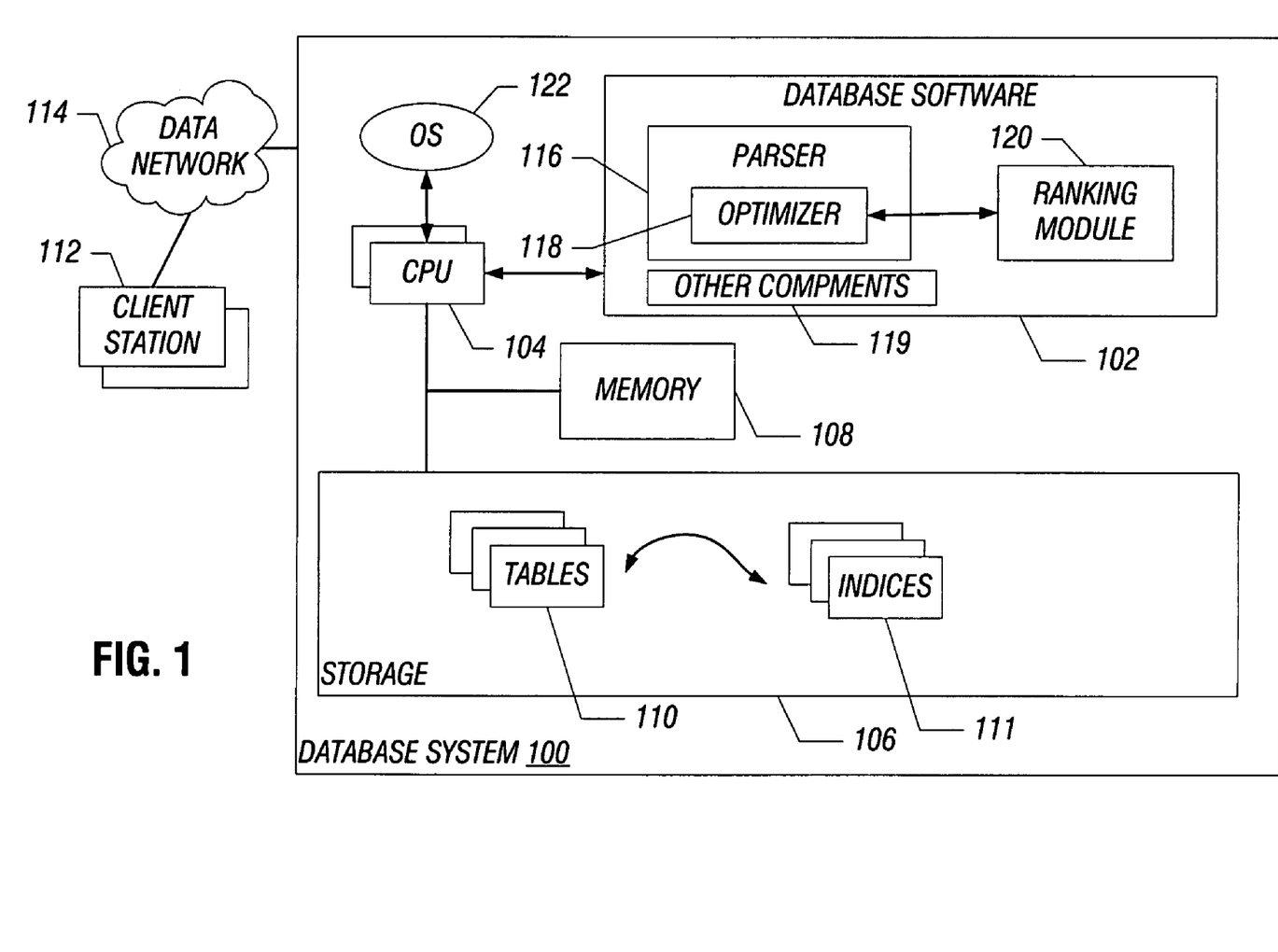
FIG. 1 is a block diagram of a database system that includes database software according to an embodiment.

FIG. 1 illustrates a database system 100 that has database software 102 executable on one or more central processing units (CPUs) 104. A "database system" refers to any system (which can be implemented in one or plural computers) that manages access of data stored in a database. A "database" refers to any repository or collection of data. The database system 100 can have a centralized architecture (in which a single node is used to implement the database system) or a distributed architecture (in which the database system is distributed across multiple nodes that execute in parallel).

The CPU(s) 104 is (are) connected to a storage 106, which can be persistent storage implemented with disk-based storage devices (e.g., magnetic or optical disk-based storage devices) or other types of storage devices. The CPU(s) 104 is (are) also connected to memory 108, which can be volatile memory (also referred to as "temporary storage") implemented with higher-speed storage devices (with access speed higher than that of the persistent storage 106), such as dynamic random access memories (DRAMs), static random access memories (SRAMs), and so forth.

The persistent storage 106 stores database tables 110 and indices 111, which are part of one or more databases maintained in the storage 106. In some implementations, the tables 110 are relational tables, and the database system 100 is a relational database management system. Indices 111 are data structures supporting fast search through the tables.

Access to the tables 110 is achieved by submitting database queries, such as Structured Query Language (SQL) queries, to the database software 102. The database software 102 accesses the tables 110 in response to received database queries, where the accesses include read accesses (to retrieve data) and/or write accesses (to update, delete, or insert data).

In the example embodiment of FIG. 1, database queries can be submitted to the database system 100 from one or more client stations 112, which are coupled to the database system 100 over a data network 114 (e.g., a local area network, a wide area network, the Internet, etc.). Alternatively, database queries can be submitted to the database system 100 at a terminal that is directly attached to the database system 100.

A database query received by the database software 102 is parsed by a parser 116 in the database software 102. The parser 116 includes an optimizer 118 to perform query optimization. The database software 102 also includes other components 119 (e.g., access layer for accessing tables and indices in the storage 106). As part of query optimization, the optimizer 118 selects an execution plan (from among multiple possible execution plans) for executing the database query received by the parser 116. An execution plan refers to a series of steps that are performed by the database software 102 in executing the database query. The optimizer 118 selects an optimal execution plan based on various factors, including statistics relating to characteristics of tables that are to be accessed, the characteristics of the received database query, and/or other factors.

In accordance with some embodiments, the optimizer 118 interacts with a ranking module 120 (note that the ranking module 120 can be viewed as either separate from or part of the optimizer 118) to allow the optimizer 118 to determine an optimal sequence of blocks of data (referred to as "data blocks") to be retrieved from one or more tables 110 (stored in persistent storage 106) involved in a database operation, into memory 108. An optimal sequence of retrieving data blocks from the persistent storage 106 into memory 108 allows increased numbers of requests to be satisfied using the data blocks in memory 108, before such data blocks have to be removed from the memory 108 for replacement by other data blocks when the memory 108 fills up, which will reduce the number of repeated reads of the same data blocks into memory from the storage.

The ranking module 120 ranks the data blocks based on information associated with the database query that is being processed by the database software 102. A database query typically specifies the table(s) on which a database operation is to be performed, the type of database operation (e.g., select, update, delete under a join of multiple tables), predicates that have to be satisfied, and so forth. The ranking module 120 solves a sequence optimization problem to allow the ranking module 120 to identify a ranking of disk pages such that the disk pages can be retrieved in an efficient order to reduce the repeated reads of the same data blocks from persistent storage 106 to memory 108.

Based on the ranking performed by the ranking module 120, the optimizer 118 is able to determine the optimal sequence in which data blocks are to be retrieved from persistent storage 106 to the memory 108. The optimal sequence 108 of retrieval of data blocks into memory 108 reduces the amount of repeated reads of the same data blocks from the persistent storage 106. Note that "optimal sequence" can refer to either the absolutely best sequence, or to any sequence that provides superior performance with respect to another sequence (e.g., an approximation of an optimal sequence).

Effectively, with the ranking module 120 according to some embodiments, query optimization by the optimizer 118 takes into account data block access information (which specifies the optimal sequence of data blocks to retrieve into memory 108), which is typically unavailable to conventional optimizers, which rely primarily on statistical cost models that contain statistics relating to tables and other like information. Thus, in accordance with some embodiments, query optimization by the optimizer 118 can be performed at both a high level (based on statistical cost models) and at a lower level (based on data block sequence optimization).

A "data block" or "block" refers to some collection of data of some predefined size. In the ensuing discussion, reference is made to a specific example of a data block—a disk page, which is read from or written to disk as an I/O (input/output) unit. The disk page is a collection of data from a persistent storage 106 implemented using a disk (or multiple disks). A disk page has a predefined size, and can include one or more rows of a table.

In the ensuing discussion, reference is made to disk pages rather than to the more generic term "data blocks." It is noted, however, that techniques according to some embodiments for disk pages can be applied to data blocks in general.

In some embodiments, the ordering of disk pages can also cluster disk pages on the same disk track closer together to improve disk performance. In other words, in retrieving disk pages from disk, disk pages on the same track are placed closer together within the defined order to allow for less disk head seek time when retrieving the disk pages from the disk-based persistent storage 106.

As noted above, the memory 108 is implemented with storage device(s) having a faster access speed than the persistent storage 106. However, due to cost concerns, the memory 108 is usually many times smaller in size than the persistent storage 106. As a result, not all data that have to be accessed for processing a database query can be fitted into the memory 108 all at once. In accordance with some embodiments, the sequence of disk pages based on the ranking generated by the ranking module 120 selects the order of disk pages that are to be retrieved into memory 108 to allow for optimal use of the memory 108 so that the database query can be processed in a more efficient manner by the database software 102.

The memory 108 effectively behaves as a cache for temporarily storing the disk pages involved in a database operation. When processing database queries, the database software 102 caches disk pages from tables (stored in the persistent storage 106) in the memory 108. The caching is according to a caching algorithm that takes into account the sequencing identified by the ranking module 120.

The caching algorithm also specifies a replacement policy when the memory 108 fills up and additional disk pages have to be retrieved into the memory 108. The replacement policy is also based on the ranking performed by the ranking module 120. Note that the replacement policy used for replacing disk pages in the memory 108 is different from the page replacement policy used by an operating system 122 in the database system 100.

A popular page replacement policy used by some operating systems or database management systems is a variation of the least-recently-used (LRU) page replacement policy. With this policy, the least recently used page in the memory 108 is overwritten by a new page read from persistent storage 106. In contrast, the replacement policy in accordance with some embodiments, which is based on ranking provided by the ranking module 120, takes into account higher-level information associated with the database query that is being processed by the database software 102, which provides accurate information regarding future access of disk pages (note that the LRU page replacement policy provides information regarding access of disk pages occurring in the past). Using the available information for future access of disk pages available in a database management system provides the opportunity for large scale optimization of disk page scheduling.

Note that the operating system 122, which is a lower-level software layer than the database software 102 (which is at the application level), typically does not use information associated with applications (such as the database software 102) for determining a replacement policy. Effectively, the caching algorithm for retrieving and replacing disk pages in the memory 108 is controlled at the query processing level rather than at the operating system level.

In some embodiments, a particular database query is modeled as a sequence of concurrent requests, where each concurrent request involves a request involving two or more blocks of data from one or more tables 110. For example, a sequence of concurrent requests for producing a result for a database query can be represented as the following example sequence: (a1, a2, a3), (a1, a4), (a2, a3, a6), where each string a_i represents a particular disk page. In the example above, (a1, a2, a3) refers to an example concurrent request that involves concurrent access of multiple disk pages a1, a2, and a3. In one example operation, the database query specifies a join operation, in which rows from different tables are joined. The indication (a1, a2, a3) means that information from disk page a1, disk page a2, and disk page a3 have to be available to perform the join operation (or other type of database operation). Another concurrent request in the above example is (a1, a4), which indicates that data from disk pages a1 and a4 are accessed to perform a database operation (such as a join).

The term "concurrent request" refers to a request that concurrently has to access data from multiple data blocks (e.g., multiple disk pages) to perform the requested operation (e.g., a join operation). For such a concurrent request, the multiple data blocks should be in fast memory concurrently for optimized performance. A sequence of concurrent requests refers to some series or succession of requests that each involves concurrent access of multiple data blocks (e.g., disk pages).

One example scenario in which some embodiments of the invention can improve database software efficiency is discussed below. Assume that a database query specifies a join of two tables (Table A and Table B), where Table A has three pages of data: a1, a2, a3; and Table B has six pages of data: b1, b2, b3, b4, b5, and b6.

Assume further that the following concurrent requests are associated with the join query:
(a1, b2), (a1, b4), (a1, b5), (a1, b6), (a2, b1), (a2, b2), (a2, b4), (a3, b1), (a3, b2), (a3, b5), (a3, b6).

Also, in the example, the memory 108 holds just three pages of data at any time (the small example memory size is to allow the example to be more readily understandable). If the ranking module 120 is not used, and the LRU page replacement policy of the operating system 122 is used instead, then the following sequence of disk reads may occur when using the LRU replacement policy:
a1, b2, b4 (3 pages)→a1, b5, b4 (1 page)→a1, b5, b6 (1 page)→a2, b1, b6 (2 pages)→a2, b1, b2 (1 page)→a2, b4, b2 (1 page)→a3, b4, b1 (2 pages)→a3, b2, b1 (1 page)→a3, b2, b5 (1 page)→a3, b4, b1 (1 page)→a3, b6, b5 (1 page).

In the above example, the number of pages read at each step is indicated in parentheses. For example, in the first step, three pages, including a1, b2, and b4 are read from disk (106) to the memory 108. The second step replaces page b2 with page b5 (which involves the reading of one page from disk to memory). Thus, in the above sequence in which the LRU replacement policy is used, fifteen page reads are performed, but only eight actual pages have to be read. The extra seven page reads are due to pages b1, b2, b4, b5, and b6 being read into memory from disk more than once.

Rather than just rely upon the LRU replacement policy of the operating system 122, the ranking module 120 according to some embodiments can be invoked to optimize the sequencing of pages to be read from disk to memory and for replacing data in the memory. One such optimized sequence is as follows:
a1, a3, b1 (3 pages)→a1, a3, b5 (1 page)→a1, a3, b6 (1 page)→a1, a3, b4 (1 page)→a2, a3, b4 (1 page)→a2, a3, b2 (1 page)→a2, a3, b1 (1 page).

In the optimized sequence, a total of nine page reads is performed (compared to the fifteen page reads using the LRU replacement policy). In the latter example, where the ranking module 120 is used, only page b1 is read twice.

Note that in the above example, Tables A and B are small tables. In actual implementation, each of Tables A and B can be relatively large tables that can contain hundreds of thousands to hundreds of millions of rows of data (corresponding to thousands, hundreds of thousands, or even millions of pages of data). The I/O savings that can be achieved when the optimizer 118 uses the ranking module 120 according to some embodiments are much greater when applied to such large tables.

The above discussion refers to performing optimization of the sequence of concurrent requests or disk pages (or sequence optimization) for a single database query. Note that the same optimization technique can be applied to multiple database queries, where the concurrent requests for the multiple database queries are merged into a stream or other collection for processing by the ranking module 120, which ranks the stream or other collection of concurrent requests.

Figure 2:
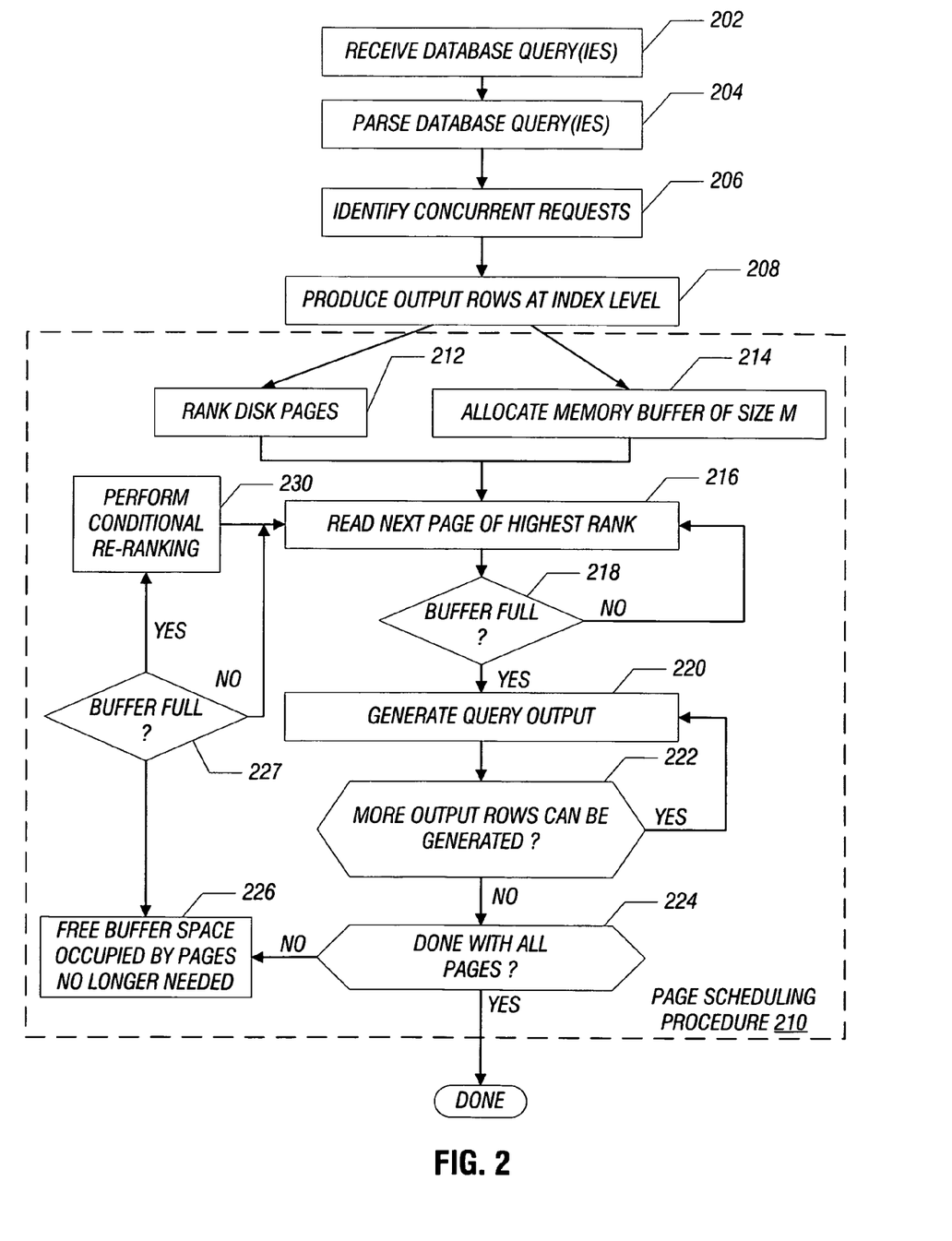
FIG. 2 is a flow diagram of a process performed by the database software, in accordance with an embodiment.

FIG. 2 shows a flow diagram of a process performed by the database software 102, in accordance with an embodiment. The database software 102 receives (at 202) a database query, which specifies a database operation (such as a join operation) to be performed on one or more tables (referred to as "base tables"). Alternatively, the database software 102 can receive multiple database queries. The received database query(ies) is (are) parsed (at 204) by the parser 116 in the database software 102. The parser 116 and optimizer 118 identify (at 206) the concurrent requests for the database query(ies). The concurrent requests are produced (at 208) in the form of output rows for the database query(ies) at the index level. An output row at the index level refers to an output row that contains index keys and corresponding page locations associated with corresponding tables that are to be accessed for producing the output. An example output row at the index level is described in detail further below.

An index key refers to some attribute(s) of a base table that has been selected to index rows of the base table. For example, a base table may have an attribute (also referred to as a column) that is a customer_ID attribute. The customer_ID attribute represents different identifiers associated with different customers. If the customer_ID attribute is selected as an index, then a separate index table (or index structure)_can be created that contains the customer_ID values (in some order, such as ascending order), which each customer_ID value associated with some indication (also stored in the index table) of the location or locations of rows in the base table that contain the corresponding customer_ID value. An index table is typically used to allow database software to more quickly find rows in a base table (while reading much fewer number of disk pages) that are responsive to a database query. The output row at the index level is produced by accessing relevant index tables (associated with the base tables involved in a database operation specified by the database query). The output row at the index level is contrasted with an output row that actually contains output data from base tables.

In some cases, even the number of concurrent requests can exceed the size of the memory 108, such that not all concurrent requests can be processed together. In this case, the processing performed by the database software 102 according to some embodiments is segmented into multiple batches, where each batch is for processing a subset of the concurrent requests that can fit within the memory 108. Thus, in accordance with some embodiments, a page scheduling procedure 210 is performed for each batch one at a time (assuming multiple batches are associated with the processing of the database query). In the scenario where the number of concurrent requests can all fit within the memory 108, then processing is performed in just one batch. In the latter scenario, the page scheduling procedure 210 would be invoked once rather than iteratively multiple times for the multi-batch scenarios.

The size of each batch (also referred to as the batch window size) can be tuned (by a user, for example, or by software) based on the size of the memory 108 and speed-performance tradeoffs of a particular database software optimizer being used.

In performing the page scheduling procedure 210, the disk pages of the batch are ranked (at 212) by the ranking module 120. The ranking is of the disk pages identified by the output rows at the index level corresponding to the particular batch that is being considered. Note that, as discussed above, the ranking by the ranking module 120 is performed during query optimization by the optimizer 118. Also, a buffer of size M in memory 108 is allocated (at 214) for the purpose of storing disk pages. The buffer allocated in the memory 108 can be smaller than the entirety of the memory 108.

According to the ranking performed by the ranking module 120, the next page (the next highest rank page) is read (at 216) by the database software 102 into the allocated memory buffer. The database software 102 next determines (at 218) if the memory buffer is full. If not, the step of reading the next page of the highest rank is repeated until the memory buffer is filled.

Once the memory buffer is determined to be full, a query output is generated (at 220) by the database software 102. Generating the query output refers to performing the requested database operation on data contained in the memory buffer. Thus, if the example database operation is a join operation, then corresponding rows that are in the memory buffer are retrieved for joining to produce the query output.

The database software 102 next determines (at 222) if more output rows can be generated using the data that is stored in the memory buffer. If so, another query output is generated (at 220). Steps 220 and 222 are repeated until no additional output rows can be generated using the data in the memory 108, at which point the database software 102 determines (at 224) whether no further pages have to be retrieved from persistent storage 106 into memory 108. If additional pages have to be retrieved, then the database software 102 frees (at 226) the buffer space occupied by the pages that are no longer needed. Thus, according to some embodiments, the replacement strategy of pages in the memory buffer involves removing the pages that are no longer needed (all the concurrent requests that depend on such pages have been processed).

The database software 102 next determines (at 227) if the memory buffer is still full. If pages were removed successfully (at 226), then the memory buffer would not be full, and the next page of the highest rank can be read (at 216). However, in some unlikely scenarios, there may be deadlock with all pages in the memory still have remaining concurrent request(s) depending on them. In this case, the memory buffer can remain full, in which case conditional re-ranking is performed (at 230) by re-invoking the ranking module 120. The conditional re-ranking of the disk pages uses the identical algorithm as the ranking performed at 212 by the ranking module 120, except that concurrent requests that have already been served (for which query outputs have already been generated) are removed from ranking consideration. The conditional re-ranking will adjust rankings of the pages such that some of the pages in the memory buffer will have lower ranks that can be removed from the memory buffer. In this case, buffer space is freed up to allow the next page of highest rank to be read into the memory buffer (at 216).

The flow of FIG. 2 can be considered as a flow having three phases. Phase 1 involves tasks 202-208, where the result is the generation of output rows at the index level for representing corresponding concurrent requests associated with the database query.

Phase 2 involves the page sequence optimization as performed by the ranking module at 212. Phase 3 involves the actual page retrieval according to the optimized sequence of pages, along with generation of the actual query output, as performed in tasks 216-230.

Figure 3:
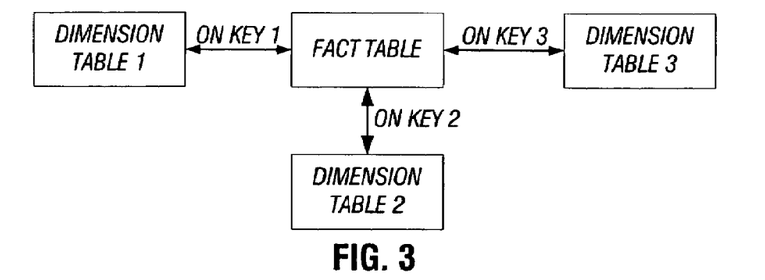
FIG. 3 illustrates star-joining of multiple tables, according to an example for which processing according to some embodiments can improve performance.

The general procedure according to some embodiments as discussed above is further discussed in the context of the following example. One such example involves a star-join query, which has a fact table that is joined with multiple dimension tables, such as that illustrated in FIG. 3. The fact table is linked to the dimension tables using a primary key/foreign key relationship. An example join query is as follows:

```
Select *
From Fact_Table, Dim_Table1, Dim_Table2, Dim_Table3
Where Fact_Table.key1 = Dim_Table1. key1
and Fact_Table.key2 = Dim_Table2. key2
and Fact_Table.key3 = Dim_Table3. key3
and .... (other range constraints on the attributes of the dimension tables and/or the fact table);
```

In the example query above, the "Where" clause specifies a join of rows from the fact table (Fact_Table) and the dimension tables Dim_Table1, Dim_Table2, Dim_Table3, provided the predicates of the "Where" clause are satisfied (in other words, key1 of the fact table is equal to key1 of dimension table Dim_Table1, key2 of the fact table is equal to key2 of the second dimension table Dim_Table2, and key3 of the fact table is equal to key3 of the third dimension table Dim_Table3, and the range constraints on other attributes that are in the Where clause are satisfied). It is assumed that the compound of key1, key2, key3 has either already been or can be extended into a primary key. The foreign keys are key1, key2, and key3, while the compound of the three foreign keys that make up the primary key for the fact table (referred to as "fact_table_primary_key") is a combination of the three keys: key1, key2, and key3. The high dimensional indexing on the compound of the three foreign keys can be in a B-tree index format, for example, or in another format. A B-tree index is a type of tree-indexing structure, which includes a set of linked nodes.

Given the above primary and foreign keys of the fact table and dimension tables, an output row at the index level is defined as follows:

```
(fact_table_primary_key, key1, key2, key3,
fact_table_disk_page_location, dim_table1_disk_page_location,
dim_table2_disk_page_location, dim_table3_disk_page_location),
``` where fact_table_primary_key is the primary key of the fact table, fact_table_disk_page_location is the page location corresponding to the particular value of fact_table_primary_key, dim_table1_disk_page_location is the page location in the first dimension table corresponding to the respective value of key1, dim_table2_disk_page_location is the page location in the second dimension table corresponding to a respective value of key2, and dim_table3_disk_page_location represents the page location in the third dimension table corresponding to a respective value of key3.

Note that the above example output row specifies a concurrent request on four different disk pages (identified by the four disk page locations).

Using the ranking module 120 according to some embodiments, the disk pages are sequenced in such a way so as to maximize the number of concurrent requests that can be satisfied by the first n pages read into the memory buffer. Maximizing the number of concurrent requests that can be satisfied by pages read into the memory buffer is a first objective. In some embodiments, once an optimal sequence of pages have been identified, the sequence can be further refined by considering a second objective, namely modifying the sequence of pages locally such that disk pages on the same disk track are clustered closer together. If disk pages on the same disk track can be retrieved one after another, then the seek time involved in reading the disk pages on the same disk track can be reduced (since the disk read head does not have to be re-positioned radially across the disk to seek a different track). The ranking module 120 has access to information relating to the organization of disk pages and disk tracks such that the ranking module 120 can perform the further refinement of the page sequence based on the second objective.

To visualize the concurrent requests, in accordance with some embodiments, the concurrent requests can be modeled by a hyper-graph that includes vertices and arcs containing the vertices. Vertices in the hyper-graph represent disk pages of data. Arcs in the hyper-graph represent a subset of vertices. An arc in the hyper-graph represents a request of a number of disk pages to be available concurrently in the memory 108 to generate a row in the query output. The size of an arc can include just two vertices, which will be the same as in an ordinary graph model. However, in general, the size of the arc may represent more than two vertices.

The hyper-graph model is converted to (or directly modeled as) a bipartite graph (V1, V2, E), where V1 is the set of disk pages and V2 is the set of concurrent requests. An edge in the bipartite graph is a dependency link between a disk page and a concurrent request, with such an edge created for each disk page and each concurrent request. A bipartite graph is a graph that has two disjointed sets of vertices that are separated such that no two vertices within the same set are adjacent (in other words, vertices in the same set are not joined by edges).

Figure 4:
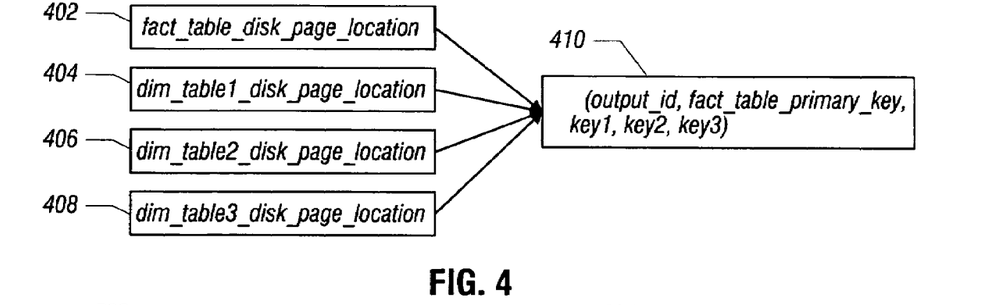
FIG. 4 illustrates a portion of a bipartite graph that represents a relationship between disk pages and a concurrent request, in accordance with an example embodiment.
Figure 5:
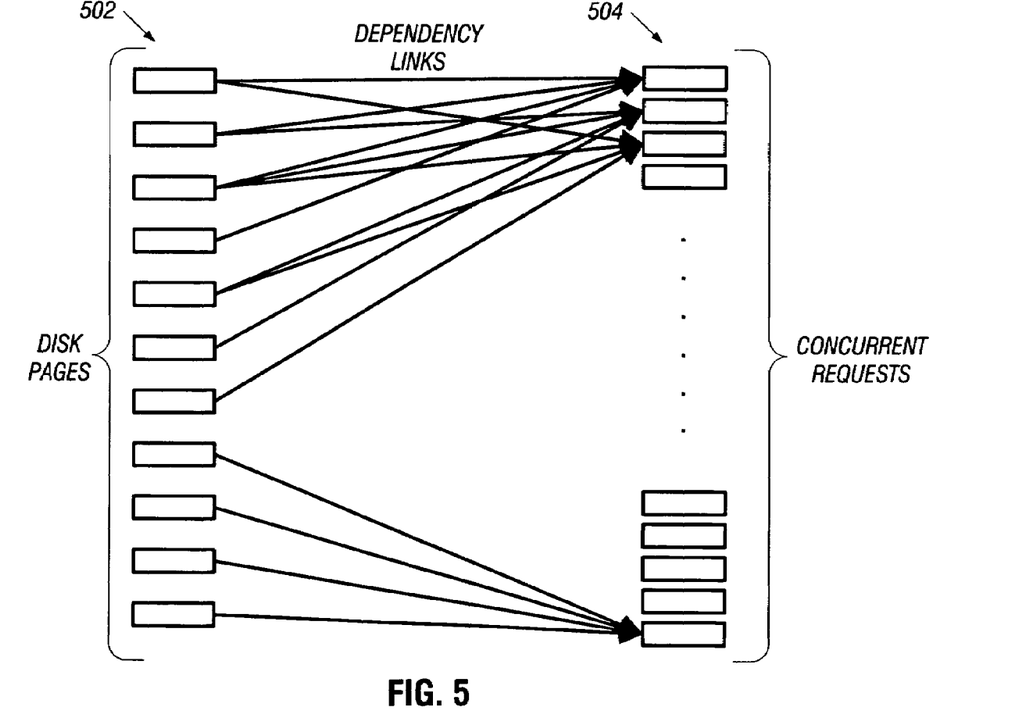
FIG. 5 illustrates a bipartite graph that represents relationships among disk pages and concurrent requests, according to an embodiment.

For a given concurrent request and the associated disk pages in the example given above, a portion of a bipartite graph for a single concurrent request is depicted in FIG. 4. The bipartite graph portion depicted in FIG. 4 has four vertices 402, 404, 406, 408 representing the four disk page locations associated with the four base tables (fact table and three dimension tables) that are being joined in the example above, and a vertex 410 that represents a concurrent request that contains the four disk page locations identified by the vertices 402, 404, 406, and 408. Note that the four vertices 402, 404, 406, and 408 also constitute vertices of the hyper-graph mentioned above, with these four vertices associated with an arc in the hyper-graph that represents the concurrent request containing the four disk page locations. A set of multiple query output rows (at the index level) form a larger bipartite graph, as depicted in the example of FIG. 5. In the bipartite graph of FIG. 5, vertices 502 represent disk pages (or more specifically, disk page locations) while vertices 504 represent concurrent requests.

Note that the bipartite graph depicted in FIG. 5 is provided to allow a user to visualize the sequence optimization problem (the problem of identifying the optimal order of disk pages to be retrieved into the memory 108). To actually solve the sequence optimization problem, the optimization problem is expressed (and approximated) as a maximum flow problem. A maximum flow problem refers to a problem of identifying a maximum flow from a source vertex to a target vertex in a network of vertices. As with the bipartite graph represented in FIG. 5, the vertices of a flow network in which a maximum flow is to be identified include a first set of intermediate vertices representing disk pages and a second set of intermediate vertices representing concurrent requests. A maximum flow is a flow of maximum value from the source vertex to the target vertex through the intermediate vertices, where flow refers to flow of quantities between vertices.

The following expresses various parameters associated with the sequence optimization problem. Let p be a disk page and r a concurrent request, each r includes a set of disk pages. Each disk page is associated with an indicator variable $x_p \in \{0, 1\}$. The variable $x_p = 1$ if disk page p is in memory 108, otherwise, $x_p = 0$. Another indicator variable, $y_r \in \{0,1\}$, is associated with each concurrent request. The variable $y_r = 1$ if the request can be served by the disk pages that are already in memory 108. However, $y_r = 0$ if the request cannot be served by the disk pages in memory, which means that at least one of the pages that have to be accessed is not in memory. The sequence optimization problem maximizes the number of requests that can be served by the disk pages in memory, and is expressed as follows:

$$\max \sum_r y_r \quad \text{(Eq. 1)}$$

$$\text{s.t.} \quad y_r \leq x_p, \text{ when } p \in r$$

$$y_r, x_p \in \{0, 1\}$$

$$\sum_p x_p < M,$$

where M is the number of disk pages that fit into the allocated memory buffer (allocated at 214 in FIG. 2). This optimization is a greedy-type optimization—maximize the number of rows in the output for the number of disk pages that can fit into the memory.

The model of Eq. 1 has a single, well-defined objective of maximizing the number of concurrent requests that can be served by the disk pages in memory. The maximization is done under a number of constraints: the first constraint specifies that $y_r$ can be 1 only if all the pages in the request are in memory, the second constraint limits the values of the variables to be integers 0/1 only, and the third constraint is on the allocated memory buffer size (M).

The problem expressed in the format of Eq. 1 is relatively difficult to solve in its original form. According to some embodiments, the model of Eq. 1 is converted to a different form to make the model easier to solve. In some embodiments, the conversion used is a Lagrangian Relaxation (LR) conversion, which produces the following LR problem (or LR model):

$$\max \left\{ \sum_r y_r - \lambda \left( \sum_p x_p - M \right) \right\} \quad \text{(Eq. 2)}$$

$$\text{s.t.} \quad y_r \leq x_p, \text{ when } p \in r, \ 0 \leq y_r, x_p \leq 1.$$

In Eq. 2 above, the parameter $\lambda$ is a Lagrangian coefficient that represents a penalty when the objective of maximizing the number of concurrent requests that can be served by disk pages in memory is violated. Also, Lagrangian Relaxation allows for relaxation of variables to take continuous values, so that the variables $y_r$, $x_p$ are allowed to take continuous values between 0 and 1, rather than be restricted to integer values 0 and 1 as specified in Eq. 1. The LR problem becomes a linear programming problem over continuous variables in real numbers. The ranking module 120 attempts to find solutions to the problem under many different values of M, which can be considered as a parameter of the model.

Although possible in some cases (particularly for smaller problems involving a small number of concurrent requests and disk pages), the LR problem can be solved directly. However, for larger problems, solving the LR problem of Eq. 2 can be computationally intensive. To more efficiently solve the sequence optimization problem, the LR problem (or LR model) of Eq. 2 is converted to a maximum flow problem.

Although some embodiments perform LR conversion as an intermediate step prior to conversion of the sequence optimization problem to a maximum flow problem, it is noted that the LR conversion can be omitted in other embodiments, with a different technique used to convert the sequence optimization problem to a maximum flow problem.

There are various possible ways to convert the LR problem into a maximum flow problem. One conversion that can be used is represented by the flow network of FIG. 6. In the flow network 600 of FIG. 6, intermediate vertices 602 and 604 connect a source vertex s to a target vertex t. The left set of intermediate vertices 602 in FIG. 6 represent disk pages, whereas the right set of intermediate vertices 604 represent concurrent requests.

The vertices of the flow network 600 are connected by arcs (the arcs are directed links), where each arc is associated with a capacity c. In other words, the arcs connecting the vertices of the flow network 600 are capacitated. An arc of capacity c allows a flow between vertices connecting the arc up to the capacity c. The arcs between the disk page vertices 602 and the request vertices 604 are defined as having infinite capacity (in other words, $c_{p,r}=\infty$, which represents the request-to-disk page dependencies). The capacities of each of the arcs from the source vertex to the disk page vertices 602 are equal to the parameter value λ. The capacity of each arc from revenue vertices 604 to the target vertex t is equal to 1 (although the capacities of some of the arcs from the concurrent request vertices to the target vertex can be set at larger values to assign more weight to such concurrent requests, which are to be treated as more important concurrent requests).

Figure 6:
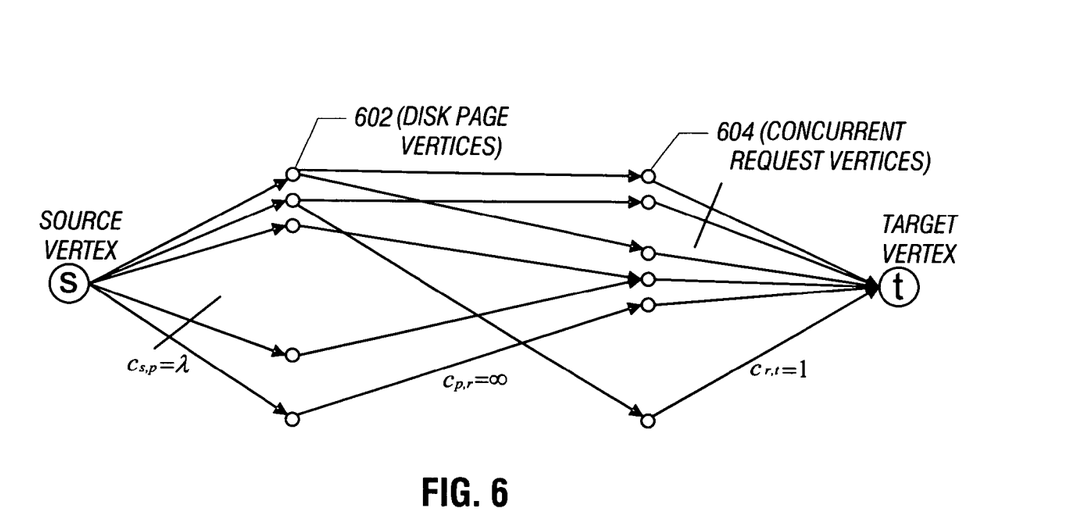
FIG. 6 illustrates a flow network having vertices representing disk pages and concurrent requests to represent a maximum flow problem, in accordance with an embodiment.
Figure 7:
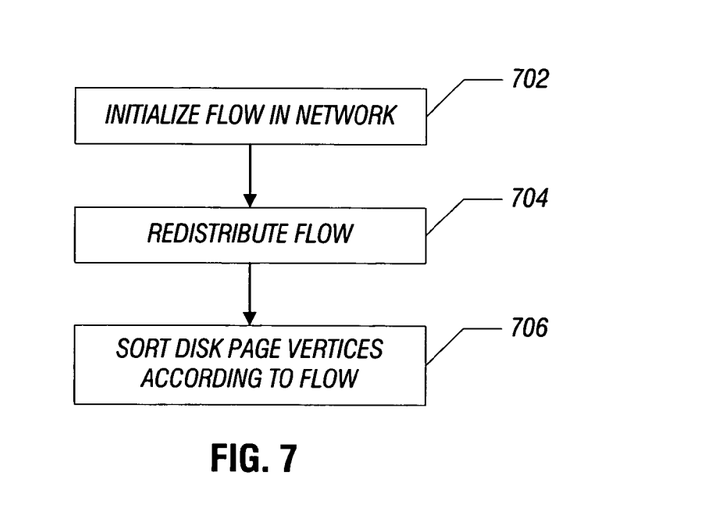
FIG. 7 is a flow diagram of a process of solving the maximum flow problem, according to an embodiment.

To solve the single-parameter maximum flow problem represented by FIG. 6, a simultaneous parametric maximum flow algorithm can be used. In one example implementation of this algorithm, as summarized in FIG. 7, the flow in the network 600 can be initialized (at 702) to some value through the arcs in the network 600. Specifically, the flow is pushed from the source vertex s to the target vertex t through every arc in such a way that all arcs from the request vertices 604 to the target vertex t become full. Then, the flow is redistributed (at 704) among the arcs extending between the source vertex s and the disk page vertices 602, and between the disk page vertices 602 and request vertices 604. In one embodiment, the redistribution iteratively identifies a pair of arcs that have unequal flow and then pushing flows to make their flows as close as possible without causing negative flows on the arcs. The redistribution continues until no further pairs of unequal flows can be found, or until some stopping rule is encountered. The procedure above is also referred to as arc balancing or vertex balancing. At this point, the maximum flow in the flow network has been identified.

As part of solving for the maximum flow, the flow from the source vertex to each disk page vertex 602 is derived. These flows are used to sort (at 706) the disk page vertices 602. This sorted order according to the flows over the arcs from the source vertex to the disk page vertices 602 is used by the ranking module 120 as the ranking for the corresponding disk pages.

Various techniques for finding maximum flows in single-parameter flow networks are described in U.S. Ser. No. 11/048,301, entitled "System and Method for Selecting a Portfolio," filed on Jan. 30, 2005 by Bin Zhang et al.; U.S. Ser. No. 11/340,081, entitled "Determining an Amount of Flow Through, or a Cut of, a Parameterized Network," filed Jan. 25, 2006 by Bin Zhang et al.; and U.S. Ser. No. 11/159,454, U.S. Patent Publication No. 2006/0291390, entitled "Determination of a State of Flow Through or a Cut of a Parameterized Network," filed Jun. 22, 2005, by Bin Zhang et al.

Instructions of software described above (including database software 102, parser 116, optimizer 118, and ranking module 120 of FIG. 1) are loaded for execution on a processor (such as one or more CPUs 104 in FIG. 1). The processor includes microprocessors, microcontrollers, processor modules or subsystems (including one or more microprocessors or microcontrollers), or other control or computing devices. As used here, a "controller" refers to hardware, software, or a combination thereof. A "controller" can refer to a single component or to plural components (whether software or hardware).

Data and instructions (of the software) are stored in respective storage devices (e.g., memory 108 and/or storage 106 in FIG. 1), which are implemented as one or more computer-readable or computer-usable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs).

In the foregoing description, numerous details are set forth to provide an understanding of the present invention. However, it will be understood by those skilled in the art that the present invention may be practiced without these details. While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A computer implemented method, executable in a database system, comprising:

receiving at least one Structured Query Language (SQL) query that specifies requests involving blocks of data;

identifying, by one or more processors, an optimized sequence relating to an order in which the blocks are to be retrieved into a storage for processing the requests, wherein identifying the sequence is based on information associated with the at least one SQL query, the information associated with the at least one SQL query including a type of database operation and predicates that are to be satisfied, wherein the predicates are specified by the at least one SQL query; and providing, by the one or more processors, an output for the at least one SQL query based on retrieving the blocks into the storage according to the identified sequence.

2. The computer implemented method of claim 1, wherein the storage comprises a temporary storage, and wherein the identified sequence is related to the order in which the blocks are to be retrieved from a persistent storage to the temporary storage for processing the requests, and wherein providing the output for the at least one SQL query is based on retrieving the blocks into the temporary storage according to the identified sequence.

3. The computer implemented method of claim 1, wherein receiving the at least one SQL query, identifying the sequence, and providing the output is performed by database software executed on the one or more processors, and wherein the identifying is performed as part of query optimization performed by an optimizer in the database software.

4. The computer implemented method of claim 1, wherein identifying the sequence comprises ranking the blocks by solving a problem that maximizes a number of the requests to be served by the blocks in the storage.

5. The computer implemented method of claim 4, wherein solving the problem comprises solving a maximum flow problem.

6. The computer implemented method of claim 5, wherein the maximum flow problem is represented by a flow network having a source vertex, a target vertex, a first set of intermediate vertices linked to the source vertex to represent blocks of data, and a second set of intermediate vertices linked to the target vertex to represent the requests, wherein solving the maximum flow problem comprises identifying flows from the source vertex to the first set of intermediate vertices, wherein the flows are indicative of the order of the blocks.

7. The computer implemented method of claim 1, wherein the storage comprises a temporary storage, and wherein the identified sequence is related to the order in which the blocks are to be retrieved from a persistent storage to the temporary storage for processing the requests, wherein the blocks comprise disk pages, and the persistent storage comprises a disk-based persistent storage having disk tracks, and wherein identifying the sequence comprises identifying the sequence in which disk pages on one disk track are clustered closer together in the sequence.

8. The computer implemented method of claim 1, wherein identifying the sequence is based on solving a model that represents the requests as concurrent requests, each concurrent request specifying concurrent access of plural blocks of data.

9. The computer implemented method of claim 1, wherein identifying the sequence reduces a number of repeated retrievals of the same blocks into the storage.

10. The computer implemented method of claim 1, further comprising caching the blocks of data in the storage according to the identified sequence that is based on the information associated with the at least one SQL query, wherein the caching uses a first replacement policy for replacing blocks of data in the storage that is different from a second replacement policy provided by an operating system in the database system.

11. The computer implemented method of claim 10, wherein using the first replacement policy comprises using a replacement policy that removes blocks for which requests that depend on such blocks have been processed.

12. The computer implemented method of claim 1, wherein identifying the sequence of blocks of data is based on a stream of the requests specified by the at least one SQL query, the method further comprising:
dividing the stream into plural batches, wherein identifying the sequence and providing the output are iteratively performed one batch at a time.

13. The computer implemented method of claim 1, wherein receiving the at least one SQL query comprises receiving plural SQL queries, wherein each of the SQL queries specifies corresponding requests, the method further comprising merging the requests of the plural SQL queries into a collection, wherein identifying the sequence is based on the collection of the merged requests.

14. The method of claim 1, wherein the predicates are specified by a WHERE clause of the at least one SQL query, and wherein identifying the sequence is based on the predicates specified by the WHERE clause.

15. A computer implemented method executable in a database system, comprising:
caching blocks of data associated with processing a database Structured Query Language (SQL) query in a temporary storage;
replacing at least some of the blocks of data in the temporary storage using a first replacement algorithm that is based on information associated with processing the database SQL query, wherein the first replacement algorithm is different from a second replacement algorithm used by an operating system of the database system; and
ranking, by one or more processors, the blocks that are involved in a database operation specified by the database SQL query to maximize a number of requests of the database operation to be served by the blocks in the temporary storage, wherein ranking the blocks is based on solving a maximum flow problem represented by a flow network having a first set of vertices representing the blocks and a second set of vertices representing the requests, and wherein the first replacement algorithm is based on the ranking of the blocks.

16. The computer implemented method of claim 15, wherein replacing the at least some of the blocks of data in the temporary storage using the first replacement algorithm comprises replacing using the first replacement algorithm that is based on whether requests specified by the database SQL query that depend upon the at least some of the blocks have already been processed.

17. The method of claim 15, wherein ranking the blocks is based on a type of the database operation and on predicates that have to be satisfied, wherein the predicates are specified by the database SQL query.

18. The method of claim 17, wherein the predicates are specified by a WHERE clause of the database SQL query, and wherein the ranking is based on the predicates specified by the WHERE clause.

19. A computer-usable storage medium containing instructions that when executed by one or more processors cause a database system to:
receive at least one Structured Query Language (SQL) query that specifies requests involving blocks of data;
identify a optimized sequence relating to an order in which the blocks are to be retrieved into a storage for processing the requests, wherein identifying the sequence is based on information associated with the at least one SQL query, the information associated with the at least one SQL query including a type of database operation and predicates that are to be satisfied, wherein the predicates are specified by the at least one SQL query; and
provide an output for the at least one SQL query based on retrieving the blocks into the storage according to the identified sequence.

20. The computer-usable storage medium of claim 19, wherein receiving the at least one SQL query comprises receiving plural SQL queries, wherein each of the SQL queries specifies corresponding requests, the instructions when executed causing the database system to further merge the requests of the plural SQL queries into a collection, wherein identifying the sequence is based on the collection of the merged requests.

21. The computer-usable storage medium of claim 19, wherein identifying the sequence comprises solving a problem that increases a number of requests that are served by blocks of data in the storage before blocks of data are removed from the storage.

22. The computer-usable storage medium of claim 19, wherein the predicates are specified by a WHERE clause of the at least one SQL query, and wherein identifying the sequence is based on the predicates specified by the WHERE clause.

* * * * *